United States Patent [19]
Van Scoy

[11] 3,943,749
[45] Mar. 16, 1976

[54] UNIDIRECTIONAL METER PROVER SPHERE INTERCHANGE AND METHOD

[75] Inventor: Davis A. Van Scoy, Simonton, Tex.

[73] Assignee: Emerson Electric Co., St. Louis, Mo.

[22] Filed: Sept. 16, 1974

[21] Appl. No.: 506,468

[52] U.S. Cl. ................................................ 73/3
[51] Int. Cl.² .................................... G01F 25/00
[58] Field of Search .................. 73/3; 15/104.06 A; 137/268

[56] References Cited
UNITED STATES PATENTS

| | | | |
|---|---|---|---|
| 3,605,790 | 9/1971 | Hunter | 137/268 |
| 3,738,153 | 6/1973 | Simmons | 73/3 |
| 3,848,621 | 11/1974 | Dickenson | 137/268 |

Primary Examiner—S. Clement Swisher
Attorney, Agent, or Firm—Polster and Polster

[57] ABSTRACT

A unidirectional meter proving device in which the interchange for transferring a sphere from a receiving tee at the downstream end of the prover loop to a launch tee at the inlet end of the loop includes a reciprocating tubular sphere carrier which moves to a sphere launching position and returns to a sphere catching position before the sphere reaches the calibrated section of the prover loop. A restriction in the launch tee controls the rate of launch of the sphere. The tubular carrier is slidably mounted in a cylindrical sleeve between the inlet and outlet openings of the interchange. A unitary seal carried on an annular flange of the carrier engages a valve seat at one end of the cylindrical sleeve when the carrier is in its sphere catching position. The annular seal is compressed into an annular groove in a valve seat, and the increased pressure in the groove is monitored as a check on the integrity of the seal.

17 Claims, 9 Drawing Figures

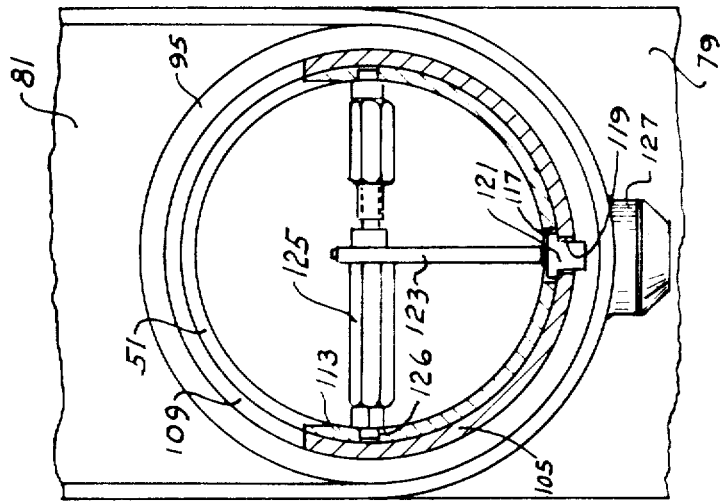
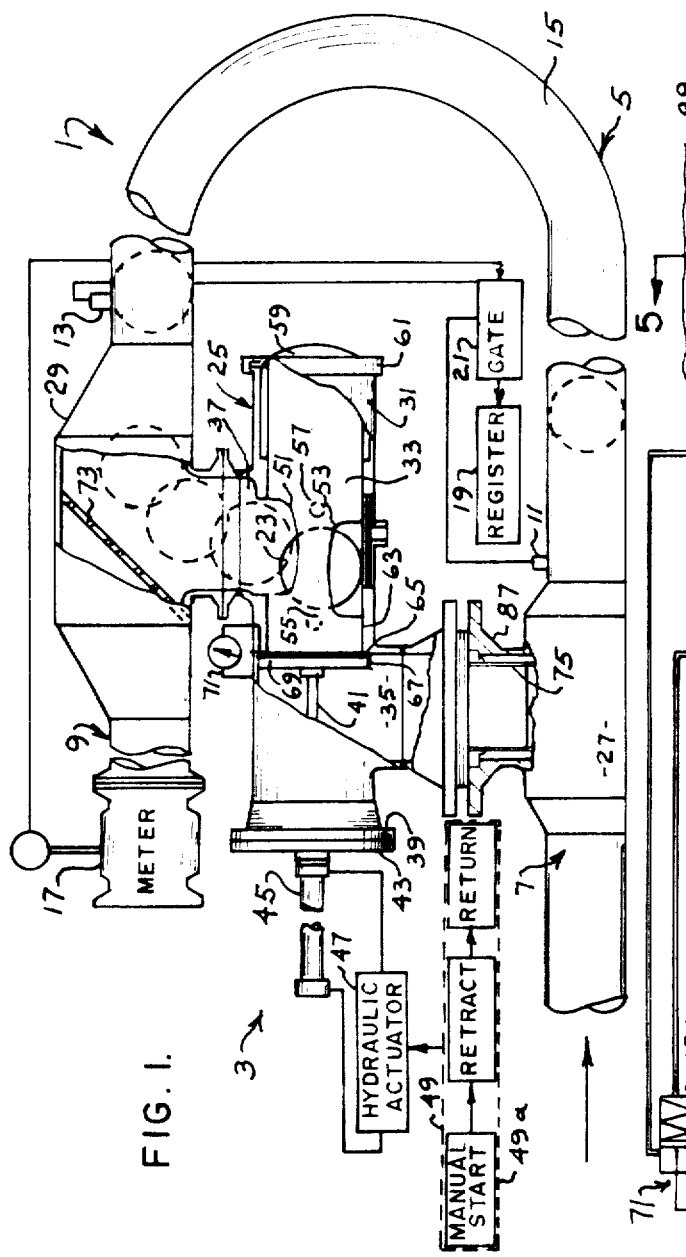
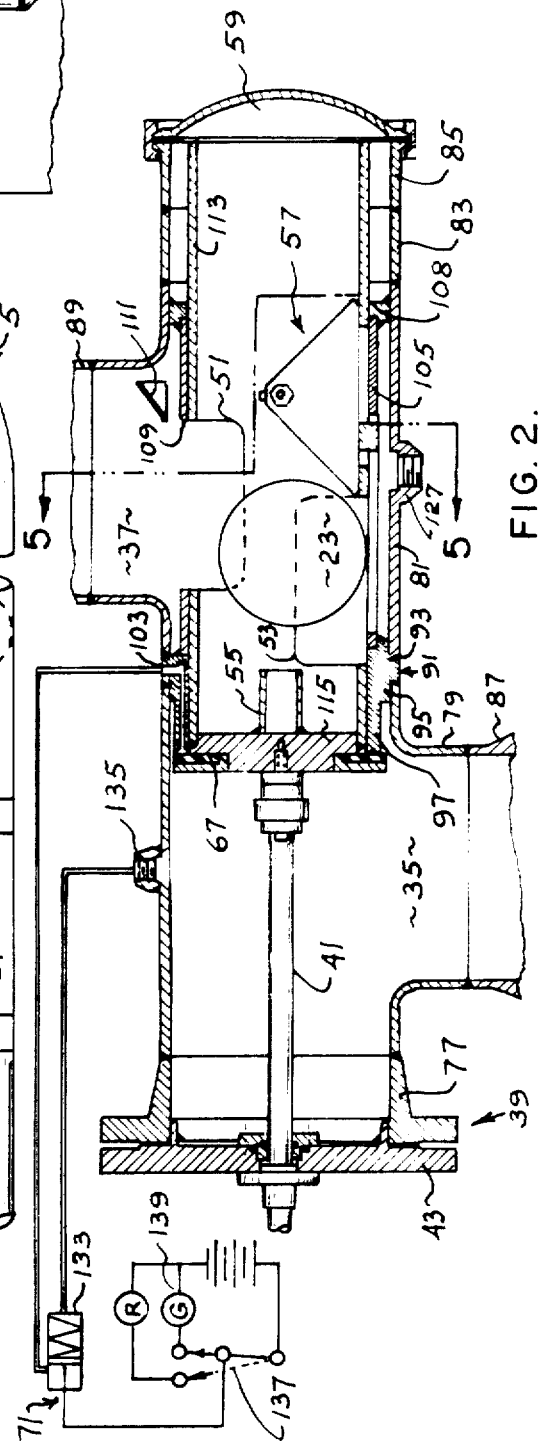

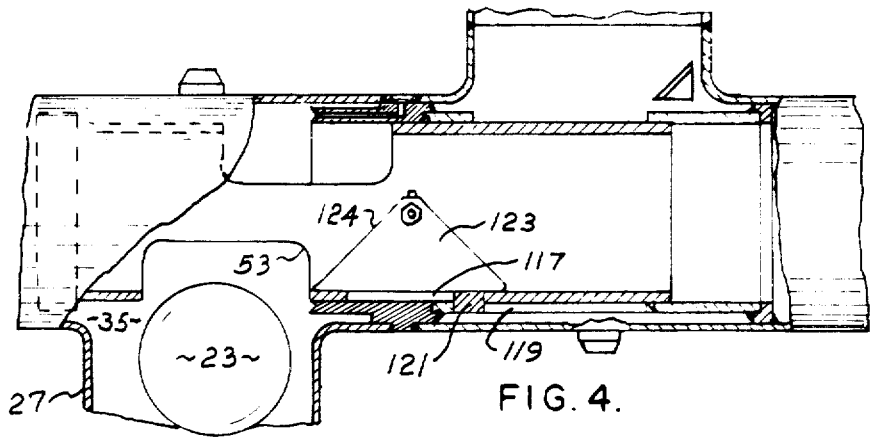
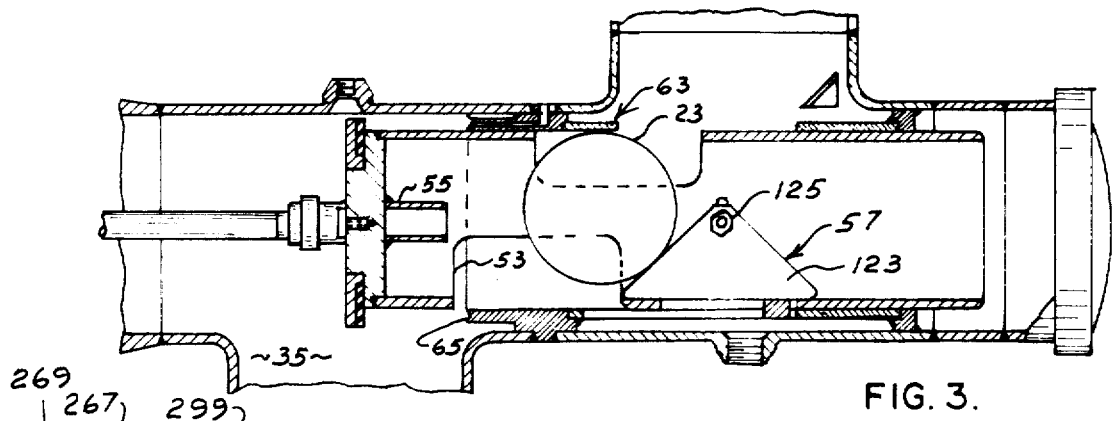
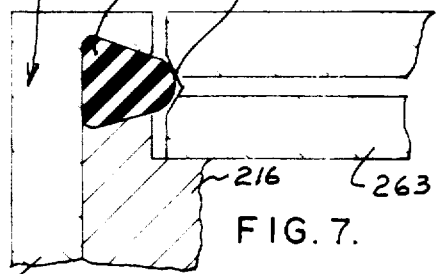
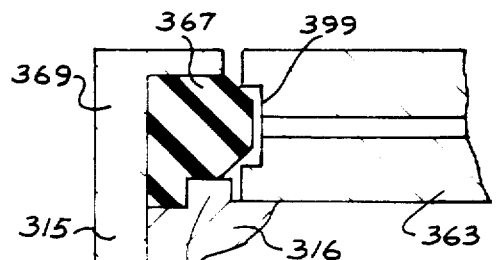
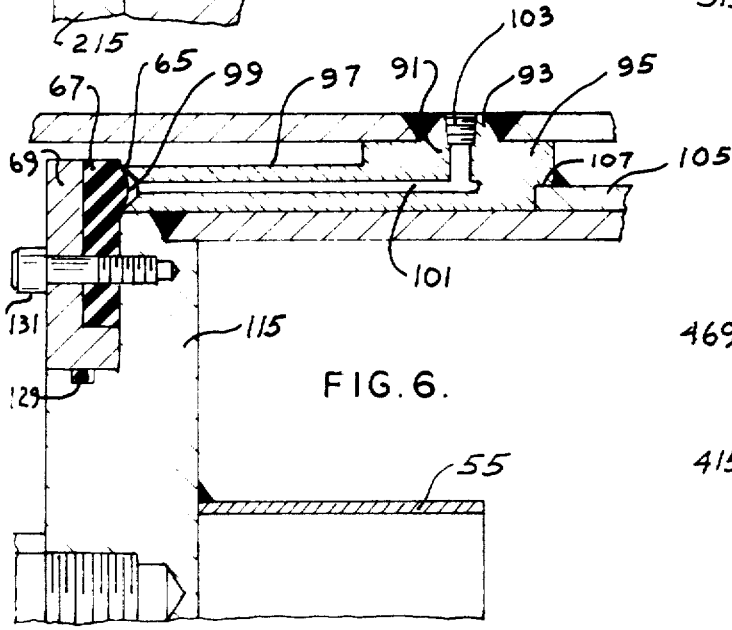
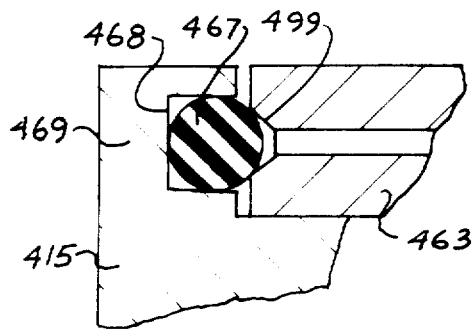

UNIDIRECTIONAL METER PROVER SPHERE INTERCHANGE AND METHOD

BACKGROUND OF THE INVENTION

This invention relates to sphere interchanges and in particular to a sphere interchange for a unidirectional meter proving device.

In various pipeline systems, particularly those used for conveying liquid petroleum products, the accuracy of the pipeline flowmeter is of such critical importance that meter proving or testing devices are utilized at frequent intervals to check the calibration of the meter. The meter prover conventionally includes a calibrated section of pipe which may be connected in series with the flowmeter. A pipeline sweeping device or sphere, which is sized to make snug contact with the wall of the calibrated section, is introduced into the pipeline and sweeps the known volume of the calibrated section during a proving run. If the dimensions of the conduit between the flowmeter and the calibrated section remain constant and if no liquid leakage occurs, the volume of liquid passing through the flowmeter during the time the sphere traverses the calibrated section will be equal to the volume of the calibrated section. Conventionally, the calibrated section is defined by a pair of switches which respectively start and stop a register associated with the flowmeter. The registered flow is then compared with the known volume of the calibrated section as a check on, or calibration of, the meter.

In a unidirectional meter prover, the calibrated section is conventionally formed as a "U" or loop, and the sphere is always launched into the same end of the loop. A sphere interchange between the ends of the loop catches the sphere at the downstream leg of the loop after a proving run, and on command begins the next proving run by transferring the sphere to the upstream leg. During a proving run, the interchange must be sealed to prevent any leakage of liquid across the interchange from the upstream (high pressure) side of the loop to the downstream (low pressure) side.

Because the accuracy of the prover depends upon there being no fluid leakage around the interchange seal or around the sphere, a successful prover interchange should have a long-lived and easily monitored seal, and should provide for easy removal of the sphere for periodic inspection or replacement. The interchange should protect the sphere from wear or damage from the moving parts of the interchange, both in normal operation and in the event of a malfunction. Throughout its operating cycle it should also minimize hydraulic effects caused by shunting of liquid across the interchange and should provide positive control of the sphere. The interchange is also desirably compact and adaptable for use in various orientations relative to the prover loop so as to fit into the limited space available in many applications. Finally, it is desirable that the interchange be simple and rugged and that it not be vulnerable to sludge or debris in the pipeline.

Various unidirectional meter provers are presently known. For the most part they include a calibrated loop having its outlet end physically above its inlet end, and a sphere interchange consisting of a launch tee by which the sphere is introduced by gravity into the prover loop, a receiving tee for separating the sphere from the outlet end of the loop and a sphere transfer device for receiving a sphere from the receiving tee and beginning a proving run by launching it into the launch tee.

None of the prior art systems possesses all of the previously mentioned desirable attributes.

One type of unidirectional meter prover system makes use of more than one sphere. In these systems, while one sphere traverses the calibrated section, the other sphere or spheres remain in the interchange and act as a seal. A second approach, using a single sphere, has a spherical valve in the interchange which seals the interchange and transfers the sphere from the outlet end to the inlet end of the calibrated loop. The limitations of both these types are well known and need no further discussion here.

A third type of system, also using a single sphere, utilizes a reciprocating piston as one of the mating parts of the interchange seal. The piston also controls the transfer of the sphere through the interchange. The present invention is an improved interchange for a meter proving system of this third type. Examples of recently proposed systems of this type are Park et al., U.S. Pat. No. 3,246,666 (1966); Layhe, U.S. Pat. No. 3,504,523 (1970); Grove et al., U.S. Pat. No. 3,638,475 (1972); Simmons, U.S. Pat. No. 3,738,153 (1973); Gloster Saro Ltd., British Patent Specification 1,201,762, (published 1970); and General Descaling Company Ltd., British Patent Specification 1,203,735 (published 1970).

The Gloster Saro, Grove et al. and Simmons patents disclose dual resilient seals which may be monitored by observing the pressure between the seals. These seals, however, require careful alignment, are vulnerable to debris and are subject to wear caused by shearing forces. Sphere removal is accomplished in these prior art systems by the costly expedient of providing separate seals at the ends of the transfer device (Park et al., Layhe, Gloster Saro), or by making the wall through which the piston rod extends removable and adding external guides for keeping the wall and piston aligned (Grove et al., General Descaling), or by inserting an external ramp into the transfer device (Simmons). All of these recent devices, except Grove et al., require a stop of some sort to hold the sphere in the receiver tee at the end of a proving run until the next proving run is begun, and the Grove et al prover interchange permits flow through it between proving runs. All except Park et al lack positive means for supporting and aligning the piston member throughout its travel, and the Park et al approach requires a dificult alignment of bearings and of seals.

SUMMARY OF THE INVENTION

The present invention provides a sphere interchange for a unidirectional meter prover which has all of the mentioned desirable characteristics, in a simple, compact and easily manufactured device.

In accordance with one aspect of the invention, such a device is provided with an improved, simple, long-lived, and easily monitored seal which includes a unitary resilient annular sealing element on an annular flange on the piston, and a complementary valve seat having a groove into which the resilient sealing element is deformed. The increased pressure in the groove is monitored as a check on the integrity of the seal.

In accordance with another aspect of the invention, the interchange includes the conventional receiving tee and launch tee, and the sphere transfer device is a generally horizontal, tubular housing having an opening in its top communicating with the receiving tee and an opening in its bottom communicating with the launch tee, with the launch tee opening displaced axially toward a first axial end of the housing. The piston rod extends through the first axial wall and a removable closure at the opposite axial end of the housing permits simple removal of the sphere. A sphere carrier attached to the piston rod is also provided with a removable (or movable) sphere restraint for removal of the sphere from the carrier. A resilient seal on the sphere carrier seals the interchange when the carrier is positioned to receive a sphere from the receiver tee. The movement of the sphere carrier, in initiating a providing run, therefore, is from its sphere receiving position to a sphere launching position in which the sphere is dropped into the launch tee, and thereafter back to its sphere receiving position before the sphere reaches the calibrated section of the proving loop. The sphere, therefore, returns directly into the sphere carrier upon completion of a proving run. A carefully sized annular restriction controls the rate of drop of the sphere into the launch tee.

In accordance with yet another aspect of the invention, a tubular sleeve is provided within the housing, substantially coaxial with the housing. The sleeve extends between the housing inlet and outlet and preferably extends beyond the housing inlet with an opening aligned with the inlet. This sleeve supports and guides the sphere carrier, which is preferably also tubular, in all positions of movement of the carrier. In the preferred embodiment described in the previous paragraph, the end of the sleeve adjacent the housing outlet provides the valve seat for the annular resilient seal carried on a flange at the end of the sphere carrier toward the first end of the housing. The sleeve and the carrier are also sized in such a manner that they greatly restrict or eliminate flow through the device in the launch position of the carrier, and completely contain the sphere within themselves at all sphere carrier positions permitting flow through the transfer device.

BRIEF DESCRIPTION OF THE DRAWINGS

In the drawings,

FIG. 1 is a view in elevation, partially cut away and partially diagrammatic, of a meter prover having a sphere interchange of the present invention;

FIG. 2 is an enlarged view in cross section, corresponding to FIG. 1, of the sphere transfer device of FIG. 1, showing the sphere carrier in its sphere receiving position;

FIG. 3 is a view in cross section corresponding to FIG. 2, showing the sphere carrier in an intermediate position;

FIG. 4 is a view in cross section, corresponding to FIGS. 2 and 3, showing the sphere carrier in its sphere launching position;

FIG. 5 is a sectional view, taken along the line 5—5 of FIG. 2;

FIG. 6 is a detail showing the preferred embodiment of sealing means;

FIG. 7 is a detail showing another embodiment of sealing means;

FIG. 8 is a detail showing another embodiment of sealing means; and

FIG. 9 is a detail showing yet another embodiment of sealing means.

DESCRIPTION OF THE PREFERRED EMBODIMENT

A. General Construction (FIG. 1)

Referring now to the drawings, and in particular to FIG. 1, reference numeral 1 indicates a meter prover embodying an improved sphere interchange 3 of the present invention. The prover 1 includes a prover loop 5 having an inlet end 7 and an outlet end 9. A pair of sphere detectors 11 and 13 define a calibrated section 15 of the loop 5. A flow meter 17 is connected, or connectable, in series with the downstream end 9 of the prover loop 5. A register 19 is electrically connected through a gate 21 to the meter 17 for recording the meter output from the time the sphere detector 11 detects a sphere 23 and causes the gate 21 to activate the register until the detector 13 detects the sphere and causes the gate 21 to deactivate the register 19. This part of the meter prover is entirely conventional.

The sphere interchange 3 includes a sphere transfer device 25 connected to the prover loop inlet end 7 by a launch tee 27 and to the loop outlet end 9 by a receiving tee 29.

The sphere transfer device 25 includes a horizontal tubular or cylindrical housing 31 and a coaxial tubular sphere carrier 33 within the housing 31.

The housing 31 has an outlet opening 35 in the bottom of its cylindrical wall and an inlet openig 37 in the top of its cylindrical wall, the outlet opening 35 being axially spaced from the inlet opening 37 toward a first axial end 39 of the housing 31. The outlet opening 35 is connected to the launch tee 27 and the inlet opening 37 is connected to the receiver tee 29. A piston rod 41 is connected to one axial end of the sphere carrier 33 and extends through a closure plate 43 at the first axial end 39 of the housing 31. A hydraulic cylinder 45 attached to the closure plate 43 controls movement of the piston rod 41, hence of the sphere carrier 33. A hydraulic actuator 47 connected to the ends of the cylinder 45 provides power for reciprocation of the sphere carrier 33. An electronic control circuit 49 in turn controls the hydraulic actuator 47.

The tubular sphere carrier 33 includes a sphere inlet 51 in its top and a sphere outlet 53 in its bottom. Restraint means, indicated at 55 and 57, in the carrier restrain axial movement of a sphere 23 within the sphere carrier 33. The restraint means 57 are made removable to permit removal of a sphere 23 through the end of the tubular carrier 33 and through a removable closure 59 at a second axial end 61 of the housing 31.

The portion of the housing 31 between its outlet 35 and inlet 37 and extending a distance from the inlet opening 37 toward its second axial end 61 has a reduced internal diameter and acts as a sleeve 63 for slidably supporting the sphere carrier 33. An end face 65 of the sleeve 63 adjacent the housing outlet 35 acts as a valve seat for a resilient seal 67 carried on an annular flange 69 at a first axial end of the sphere carrier (toward the first end of the housing 31). Leak detecting means 71 are associated with the valve seat 65.

Launch tee 27 and receiver tee 29 are generally of standard construction. Both are substantially enlarged in diameter to provide smooth and reliable introduction of the sphere into the prover loop 5 and separation of the sphere from it. It will be understood that the launch tee 27 and receive tee 29 may be thought of as the entire conduit sections below and above the cylindrical wall of the housing 31, respectively.

Receiver tee 29 is provided with a perforated barrier 73 for separating the sphere from the flow stream in the prover loop, in accordance with well-known practice.

Within the launch tee 27 is an annular restriction 75, having a diameter slightly larger than the diameter of the sphere 23, for controlling the rate at which the sphere is launched into the prover loop 5. The annular restriction tube 75 in the launch tee 27 is carefully sized to provide a desired rate of drop for the sphere 23. If the diameter of the restriction 75 is too near the diameter of the sphere, the sphere may tend to rise, rather than fall, in the launch tee during launch. It has been found that over a wide range of prover sizes a diameter of the restriction 75 of from about one quarter to one half inch greater than the sphere diameter provides ample time for the sphere carrier 33 to return to its sphere receiving position, without danger of creating such a buoyancy effect. For example, in an eight inch prover, a restriction diameter about 0.3 inches larger than the sphere diameter has been found to be optimal, and in a thirty inch prover a difference of about 0.4 inches is optimal. In this regard, it should be noted that the sphere diameter is conventionally slightly greater than the diameter of the calibrated section, generally on the order of two to three percent greater. Also, it should be noted that the restriction tube 75 preferably is spaced from the sphere carrier by a distance greater than the radius of the sphere 23, to permit sphere 23 to fall free until it has cleared the carrier 33. In other respects, the launch tee 27 and receiver tee 29 are standard configurations.

B. Operation

With the sphere 23 in the sphere carrier as shown in FIG. 1, a proving run is commenced by pressing a manual start switch 49a of the electronic control 49. The control 49 is an automatic sequencer which causes the hydraulic actuator 47 to move the sphere carrier to the left as viewed in FIG. 1 from its receive position shown in FIGS. 1 and 2. When the sphere carrier 33 has moved to the position shown in FIG. 3, in which liquid can first pass through the interchange 3 between the sleeve end 65 and the leading edge of the sphere outlet 53, the sphere 23 is completely trapped within the sleeve 63 by restraint 57. When the sphere carrier 33 has moved to its launch position shown in FIG. 4, in which its sphere outlet 53 is aligned with the housing outlet opening 35 to permit the sphere 23 to drop into the launch tee 27, the end of the tubular carrier 33 covers the inlet opening 37. The tubular carrier 33 and sleeve 63 thus form a sliding seal and prevent any substantial leakage of liquid through the interchange 3 in the launch position shown in FIG. 4. The transfer device 25 maintains positive sphere control throughout the sphere transfer sequence and prevents the sphere from getting out of sequence regardless of possible malfunctions of the control system. Also, liquid flow through the exchange 3 is essentially eliminated at all times except when the sphere 23 is completely trapped within the sleeve 63 and when the sphere is falling toward the prover loop inlet. After the sphere has dropped clear of the carrier 33, the restriction 75 reduces its rate of drop to a controlled value. Therefore, before the sphere reaches the first sphere detector 11 of the calibrated section 15, the control 49 has caused the hydraulic actuator to return the sphere carrier 33 to its sphere receiving position in which the seal 67 mates with the seat 65 to prevent bypass flow through the transfer mechanism. The seal testing means 71 immediately indicates whether a fluid-tight seal has been made. The sphere 23 then traverses the calibrated section 15, reaches the receiver tee 27 and drops directly into the sphere carrier 33. During the proving run, liquid pressure within the conduit tends to close rather than open the valve 67, and no additional hydraulic pressure is needed to keep the valve closed.

C. Constructional Details

The detailed construction of the sphere transfer device 25 is shown in FIGS. 2-6. The device is constructed substantially entirely of standard piping and tubing sections, which may be assembled with only a minimum of machining, and with simple welds having no welding crosses, for maximum strength.

The housing 31 includes, at its first axial end 39, a flange pipe 77 to which the closure plate 43 is secured; an outlet piping tee 79 defining the outlet opening 35; an inlet piping tee 81 defining the inlet opening 37; an extension pipe 83 and an end pipe 85 at the second axial end 61 of the housing for removably mounting the closure 59. All of these sections are welded to each other (the outlet tee 79 and inlet tee 81 being welded to a rib 93 on a sleeve section 91 as described hereinafter) to form the tubular housing 31. Flanges 87 and 89 are welded to the legs of the outlet tee 79 and inlet tee 81 respectively for connecting the transfer device 25 to the launch tee 27 and receiver tee 29 respectively.

The sleeve part 63 is formed as a separate piping section within and coaxial with the housing 31. As best seen in FIG. 6, a first sleeve section 91 includes an external circumferential rib 93 to which the ends of the housing tees 79 and 81 are welded, a smaller diameter spacer part 95 which engages the inner surfaces of the tees 79 and 81, and a yet smaller diameter support sleeve part 97 extending axially toward the first end 39 of the housing 31. The first end face 65 of the sleeve part 97 is provided with an annular groove 99 connected by a bore 101 to a fitting 103 for attachment of the leak detecting means 71 as described hereinafter. The sleeve 63 also includes a second pipe section 105 welded in a rabbet 107 in the second end of the first sleeve section 91. The sleeve sections 91 and 105 are of the same internal diameter and are easily aligned to form a sleeve which provides complete support for the carrier 33 in all the operative positions of the carrier 33. The spacer part 95 of the first sleeve part 91 and a spacer 108 at the second end of the second sleeve part 105 secure and align the sleeve 63 within the casing 31. A sphere opening 109 in the upper surface of the sleeve 105 is substantially smaller than the leg of the inlet tee 81, and a guide wedge 111 in the inlet tee 81 directs the sphere 23 into it.

The sphere carrier 33 comprises a section of tubing 113 at the first axial end of which is welded a closure plate 115.

As best seen in FIG. 5, a slot 117 in the bottom of the carrier tube 113 is kept in alignment with a slot 119 in the sleeve section 105 by a key 121. The key 121 also acts as a stop for limiting the movement of the carrier toward the first end 39 of the transfer device 25, as seen in FIG. 4. It will also be seen from FIG. 4 that the key 121 restricts liquid flow through the slots 117 and 119 during launch of the sphere 23.

The restraint means 55 at the first end of the carrier 33 is simply a section of tube welded to the center of the closure plate 115. The restraint means 57, which defines the other end of a sphere-retaining chamber within the carrier 33, includes a vertical triangular plate 123 which forms a ramp 124. The top of the ramp 124 is below the second end of the inlet 51 in the carrier 33 and the bottom of the ramp 124 is adjacent the second end of the outlet 53, to assure smooth launching of the sphere 23. The lower edge of the plate 123 extends beyond the ends of the slot 117. The plate 123 is held against axial movement by an adjustable stay 125, the ends of which are held by sockets 126 in the carrier side wall 113. It will be seen that the stay 125 is easily shortened by turning it with a wrench, and the entire assembly 57 is then easily removed through the second axial end 61 of the transfer device 25. With the carrier 33 in its receive position, as shown in FIG. 2, the sphere 23 is therefore easily retrieved by rolling it out through the second end of the carrier tube 113, without requiring any special equipment.

At the bottom of the housing inlet tee 81 is a drain 127, which may be used both in cleaning the interior of the housing 31 if debris build-up should eventually interfere with operation, as well as for draining the transfer device 25 before removing the sphere 23.

The closure plate 115 carries the annular flange 69 and resilient seal 67. An O-ring 129 and tapped bolt 131 permit the flange 69 to be removed from the end plate 115 for replacement of the seal 67, while assuring a liquid-tight fit between the flange 69 and end plate 115. The monitorable seal, shown particularly in FIGS. 2 and 6, is an important part of the present invention. Because the seat 65 lies in a vertical plane, it is protected from interference by sludge and foreign material in the pipeline liquid. Equally important, the provision of a groove in the generally flat seat 65 in combination with the flat resilient seal 67 gives a positive indication when a completely liquid-tight seal is formed, because the seal 67 contacts the seat surface 65 on both sides of the groove 99 and is deformed into the groove 99 thereby decreasing the volume of the groove and increasing pressure within the groove 99 and the bore 101. This increase in pressure is easily monitored by the leak detecting means 71, which may be of known construction including a differential pressure switch 121 connected between the fitting 103 and a nipple 135 in the upper wall of the outlet tee 79 of the casing 31. Increased pressure in the groove 99 moves the pressure switch to the right as viewed in FIG. 2 and causes its electrical switch 137 to light an indicator light 139. Of course, the pressure switch may also be connected into the circuit of the gate 21 to disable the register 19 if a seal has not been made before the sphere 23 reaches the first detector 11.

It will be seen that the sealing means of this invention provide a positive indication that a seal has been made, while requiring only a single resilient seal and not requiring carefully aligned and finished mating surfaces.

FIGS. 7, 8 and 9 show other single resilient seals and annularly grooved seating faces which have many of the advantages of, and may be substituted for, the preferred embodiment shown in FIG. 6. In these embodiments, the resilient seal contacts only the edge or side wall of the groove itself and thus requires more careful alignment than the preferred embodiment. However, these embodiments are far simpler than double seals utilized heretofore, particularly because the process of milling the groove in the end face of the sleeve produces an accurate and smooth seal for the resilient seal. Furthermore, alignment of the mating parts is far less a problem with the preferred embodiment of meter prover interchange described than with previously known interchanges because the moving half of the valve seal is completely supported and aligned throughout its motion by the tube-within-a-tube construction of the carrier and sleeve. In FIG. 7, a rounded delta resilient seal 267 is trapped between end plates 215 and 216 of the carrier and is held to an annular flange part 269 of the end plate 215. A shallow V-shaped groove 299 in the end face of tubular sleeve 263 is wide enough that the rounded end of the resilient seal 267 extends into the groove 299 and contacts the sides of the groove. The volume of the annulus trapped by the resilient seal 267 is small, making this arrangement particularly sensitive to the slightest leakage.

The arrangement shown in FIG. 8 is similar to the preceding example and includes a resilient seal 367 held to an annular flange part 369 of an end plate part 315 by an annular rib 331 on a second end plate part 316 of the carrier. Tapered radial sides of the resilient seal 367 engage the radial edges of a square annular groove 399 in the end face of a sleeve 363. The volume trapped within the groove is easily controlled in accordance with the depth of the groove 399 and the shape of resilient seal 367.

In FIG. 9 is shown a simple O-ring 467 held in a groove 468 in annular flange 469 of carrier end plate 415. The O-ring 467 engages the radial edges and sides of tapered groove 499 in sleeve 463.

Numerous variations in the meter prover interchange of this invention, within the scope of the appended claims, will be apparent to those skilled in the art in the light of the foregoing description.

Having thus described the invention, what is claimed and desired to be secured by Letters Patent is:

1. In a unidirectional meter proving device comprising a piping loop having an upstream end and a downstream end; a pair of detectors in the loop for defining a calibrated section of the loop; and a sphere interchange comprising a housing having a first opening communicating with the outlet end of the piping loop and a second opening communicating with the inlet end of the piping loop, and seal means in the housing for providing a fluid seal between the first opening and the second opening during a proving run, the improvement wherein the seal means comprise:
 a. a closure member reciprocable along an axis of movement, the closure member comprising
  1. an annular flange lying substantially in a plane perpendicular to the axis of movement of the closure member, and
  2. a resilient annular seal carried on the flange;
 b. a valve seat in the housing between the first opening and the second opening, the valve seat comprising
  1. an annular seating face lying substantially in a plane perpendicular to the axis of movement of the closure member, and
  2. an annular groove in the seating face, said annular groove being proportioned and positioned to be sealed by the resilient seal, pressure in the groove being increased by compression of the resilient seal into the groove; and
 c. seal testing means responsive to increased pressure in the groove.

2. The improvement of claim 1 wherein the annular seal includes a substantially flat sealing face proportioned to engage the annular seating face on both radial sides of the annular groove.

3. The improvement of claim 1 wherein the annular seal includes a convex sealing face adapted to contact opposed side walls of the annular groove.

4. In a unidirectional meter proving device comprising a piping loop having an upstream end and a downstream end; a pair of sphere detectors in the loop for defining a calibrated section of the loop; a launch tee for launching a sphere into the upstream end of the loop and a receiving tee for recovering the sphere from the downstream end of the loop; a sphere transfer device including transfer means for transferring the sphere from the receiving tee to the launch tee to begin a proving run and sealing means for providing a fluid seal between the receiving tee and the launch tee during the proving run; and control means for controlling movement of the sphere transfer device, the improvement wherein
  a. the transfer means comprise
    1. a generally horizontal tubular housing having an inlet opening communicating with the receiving tee in its top and an outlet opening communicating with the launch tee in its bottom, the outlet opening being axially spaced from the inlet opening toward a first axial end of the housing,
    2. a piston in the housing,
    3. a transverse opening through the piston, adapted to receive a sphere, the piston being axially reciprocable in the housing from a receive position in which the transverse opening is aligned with the inlet opening to a launch position in which the transverse opening is aligned with the outlet opening;
  b. the sealing means comprise
    1. resilient seal means carried by the piston between the transverse opening and the first axial end of the housing,
    2. seating means in the housing, axially between the inlet opening and outlet opening, adapted to be engaged by the resilient seal means, the seal means and seating means being proportioned and positioned to provide the fluid seal between the receiving tee and the launch tee when the piston is in its receive position; and
  c. the control means comprise means
    1. for moving the piston from its receive position to its launch position, thereby launching the sphere from the transverse opening in the piston into the launch tee, and
    2. for returning the piston to its receive position before the sphere reaches the calibrated section of the loop.

5. The improvement of claim 4 including means for reducing flow between the inlet opening and outlet opening when the piston is in its launch position.

6. The improvement of claim 5 wherein the means for reducing flow comprise an extension of the piston extending axially across the inlet opening when the piston is in its launch position.

7. The improvement of claim 4 including a piston rod secured to the piston and extending through the first axial end of the housing; a removable closure for a second axial end of the tubular housing opposite the first axial end of the housing; and a removable restraint carried by the piston between the transverse opening and the removable closure, whereby removal of the closure end of the restraint permits removal of the sphere through the second axial end of the housing when the piston is in its receive position.

8. The improvement of claim 4 including annular restriction means in the launch tee spaced from the piston by a distance greater than the radius of the sphere, for retarding the rate of launching the sphere, the annular restriction means defining a circular opening having a diameter which is about one-quarter to one-half inch greater than the diameter of the sphere.

9. The improvement of claim 4 wherein
  a. the resilient seal means comprise
    1. an annular flange on the piston lying substantially in a plane perpendicular to the axis of movement of the piston, and
    2. a resilient annular seal carried on the flange;
  b. the seating means comprise
    1. an annular seating face lying substantially in a plane perpendicular to the axis of movement of the piston, and
    2. an annular groove in the seating face, the annular groove being proportioned and positioned to be sealed by the resilient annular seal, pressure in the groove being increased by compression of the resilient seal into the groove; and
  c. seal testing means are provided, the seal testing means being responsive to increased pressure in the groove.

10. The improvement of claim 9 wherein the annular seating face comprises an axial end of a cylindrical sleeve part in the housing extending axially between the inlet opening and the outlet opening, the sleeve part slidably supporting the piston.

11. In a unidirectional meter proving device comprising a piping loop having an upstream end and a downstream end; a pair of detectors in the loop for defining a calibrated section of the loop; and a sphere interchange for receiving a sphere from the downstream end of the piping loop and selectively launching the sphere into the upstream end of the piping loop, the improvement wherein the sphere interchange comprises:
  a housing having a generally cylindrical wall, a first axial end and a second axial end;
  an inlet opening in the top of the cylindrical wall communicating with the downstream end of the piping loop;
  an outlet opening in the bottom of the cylindrical wall, communicating with the inlet end of the piping loop, and being axially spaced from the inlet opening toward the first axial end of the housing;
  valve seating means in the housing between the inlet opening and the outlet opening;
  valve means cooperable with said valve seating means to form a fluid-tight seal;
  a piston rod mounted through the first axial end of the housing for reciprocative movement, the valve means being carried by the piston rod for movement alternately into cooperation with the valve seating means and away from the valve seating means toward the first axial end of the housing; and
  a closure member on the second axial end of the housing, said closure member being openable for removal of a sphere through the second axial end of the housing.

12. The improvement of claim 11 including a sphere carrier attached to the piston rod, the carrier including a sphere retaining means for limiting axial movement of a sphere in the carrier, the sphere retaining means comprising means accessible through the second axial end of the housing for rendering said sphere retaining means at least partially movable to permit removal of a sphere through an axial end of the carrier toward the second end of the housing.

13. In a unidirectional meter proving device comprising a piping loop having an upstream end and a downstream end; a pair of sphere detectors in the loop for defining a calibrated section of the loop; a launch tee for launching a sphere into the upstream end of the loop and a receiving tee for recovering the sphere from the downstream end of the loop; and a sphere transfer device for receiving a sphere from the receiving tee and selectively launching the sphere into the launch tee, the improvement wherein the sphere transfer device comprises:
 a. a housing having a generally tubular side wall, a first axial end wall, and a second axial end wall, the side wall having in it
  1. a sphere inlet communicating with the receiving tee, and
  2. a sphere outlet communicating with the launch tee, the sphere outlet being displaced axially from the inlet toward the first axial end wall of the housing;
 b. a reciprocating sphere carrier within the housing, the sphere carrier having a tubular side wall generally coaxial with the housing side wall, a first axial end toward the first axial end wall of the housing, and a second axial end toward the second axial end wall of the housing, the carrier side wall having in it
  1. a sphere receiving opening, and
  2. a sphere launching opening the sphere carrier being movable between a sphere receiving position in which its sphere receiving opening is aligned with the housing inlet and a sphere launching position in which its sphere launching opening is aligned with the housing outlet;
 c. retaining means in the sphere carrier for limiting axial movement of a sphere contained therein;
 d. a cylindrical sleeve part in the housing extending axially between the inlet opening and the outlet opening and slidably supporting the tubular wall of the sphere carrier, the sleeve part having an axial length, equal to at least one-half the axial length of the sphere receiving opening in the sphere carrier, sufficient to trap the sphere within the sleeve at all axial positions of the sphere carrier in which its sphere receiving opening communicates with the receiving tee while its sphere launching opening communicates with the launch tee;
 e. said sleeve part having an axial end adjacent one of said sphere inlet and said sphere outlet, said axial end comprising a valve seat; and
 f. valve means carried by said sphere carrier for co-operating with said valve seat to form a fluid-tight seal between said sphere inlet and said sphere outlet, said valve means comprising an annular flange on the sphere carrier adapted to engage the valve seat when the carrier is in one of said sphere receiving or sphere launching positions.

14. The improvement of claim 13 wherein the annular flange is at the first axial end of the sphere carrier, wherein the sleeve part extends toward the second axial end wall of the housing beyond the sphere inlet and is provided with a sphere inlet opening generally aligned with the sphere inlet in the housing, and wherein the tubular side wall of the sphere carrier extends completely across the sphere inlet opening in the sleeve when the sphere carrier is in its sphere launching position.

15. The improvement of claim 13 further including a piston rod secured to the first axial end of the sphere carrier and extending through the first axial end wall of the housing, and wherein the annular flange is at the first axial end of the sphere carrier; wherein the second axial end wall of the housing comprises a removable closure; and wherein the retaining means in the sphere carrier is at least partially movable to permit removal of a sphere through the second axial end of the sphere carrier and through the removable closure of the housing.

16. In a unidirectional meter proving device comprising a piping loop having an upstream end and a downstream end; a pair of sphere detectors in the loop for defining a calibrated section of the loop; a resilient sphere having a diameter equal to or slightly greater than the inner diameter of the calibrated section; a launch tee for launching the sphere into the upstream end of the loop; a sphere transfer means for transferring the sphere from the downstream end of the piping loop to the launch tee to begin a proving run; and sealing means for providing a fluid seal between the downstream end of the piping loop and the launch tee during a proving run, the improvement comprising:
 a. control means for selectively beginning a proving run by opening the sealing means and causing the transfer means to transfer the sphere to the launch tee, and thereafter closing the sealing means to provide a fluid seal between the downstream end of the piping loop and the launch tee; and
 b. annular restriction means in the launch tee for retarding the rate of launching the sphere, the annular restriction means being spaced from the sealing means by a distance greater than the radius of the sphere and defining a circular opening having a diameter about one-quarter to one-half inch greater than the diameter of the sphere.

17. A meter proving method utilizing a unidirectional meter prover comprising a piping loop having an upstream end and a downstream end; a pair of sphere detectors in the loop for defining a calibrated section of the loop; and sphere transfer means for transferring a sphere from the downstream end of the piping loop to the launch tee to begin a proving run, the sphere transfer means comprising a reciprocating sphere carrier including means for retaining a sphere in the sphere carrier as the sphere carrier transfers the sphere from the downstream end of the piping loop to the launch tee, the sphere carrier further comprising sealing means for providing a fluid seal between the downstream end of the piping loop and the launch tee during a proving run, the method comprising shifting the sphere carrier from a sphere receiving position in which the sphere retaining means are positioned to receive a sphere from the outlet end of the piping loop to a sphere launching position in which the sphere is launched from the sphere retaining means into an unobstructed conduit between the sphere carrier and the calibrated section of the piping loop, and thereafter returning the sphere carrier to its sphere receiving position and initiating a leakage detection operation before the sphere reaches the calibrated section.

* * * * *